UNITED STATES PATENT OFFICE.

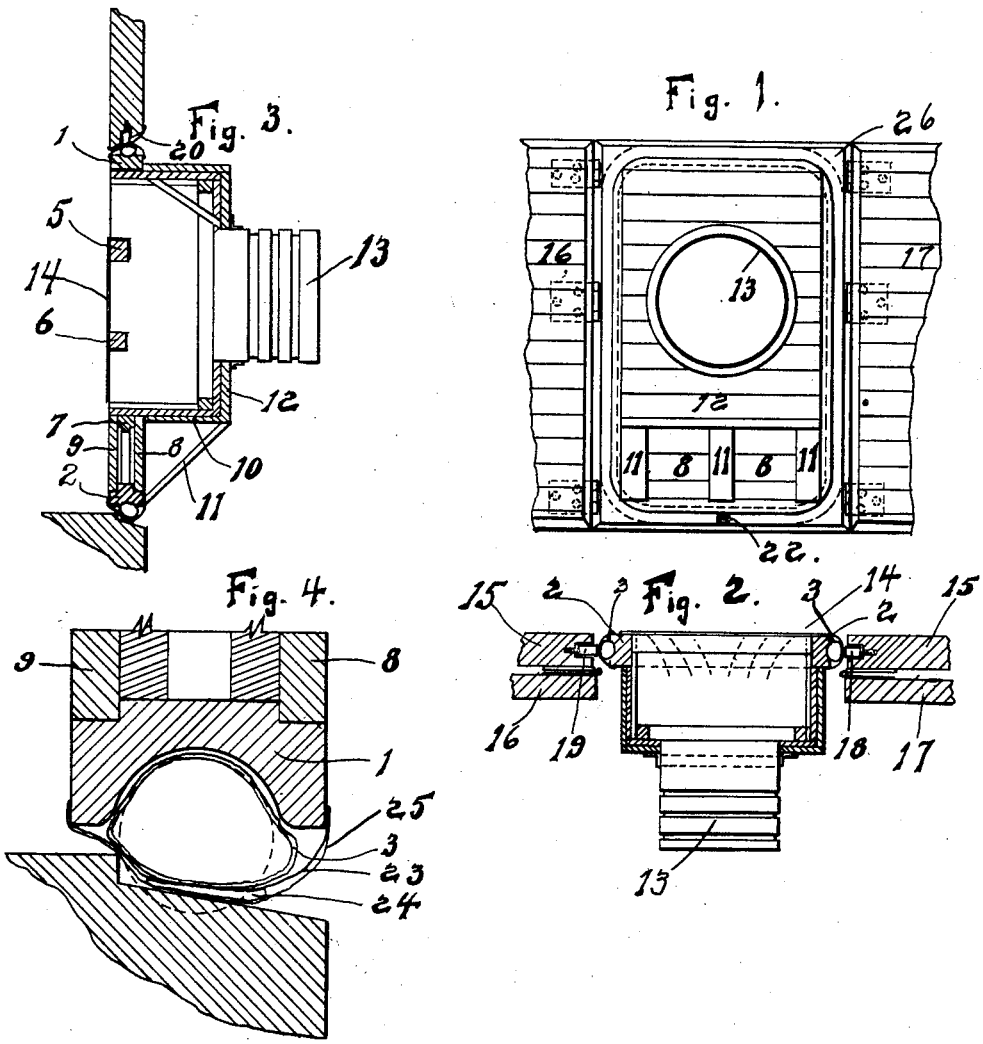

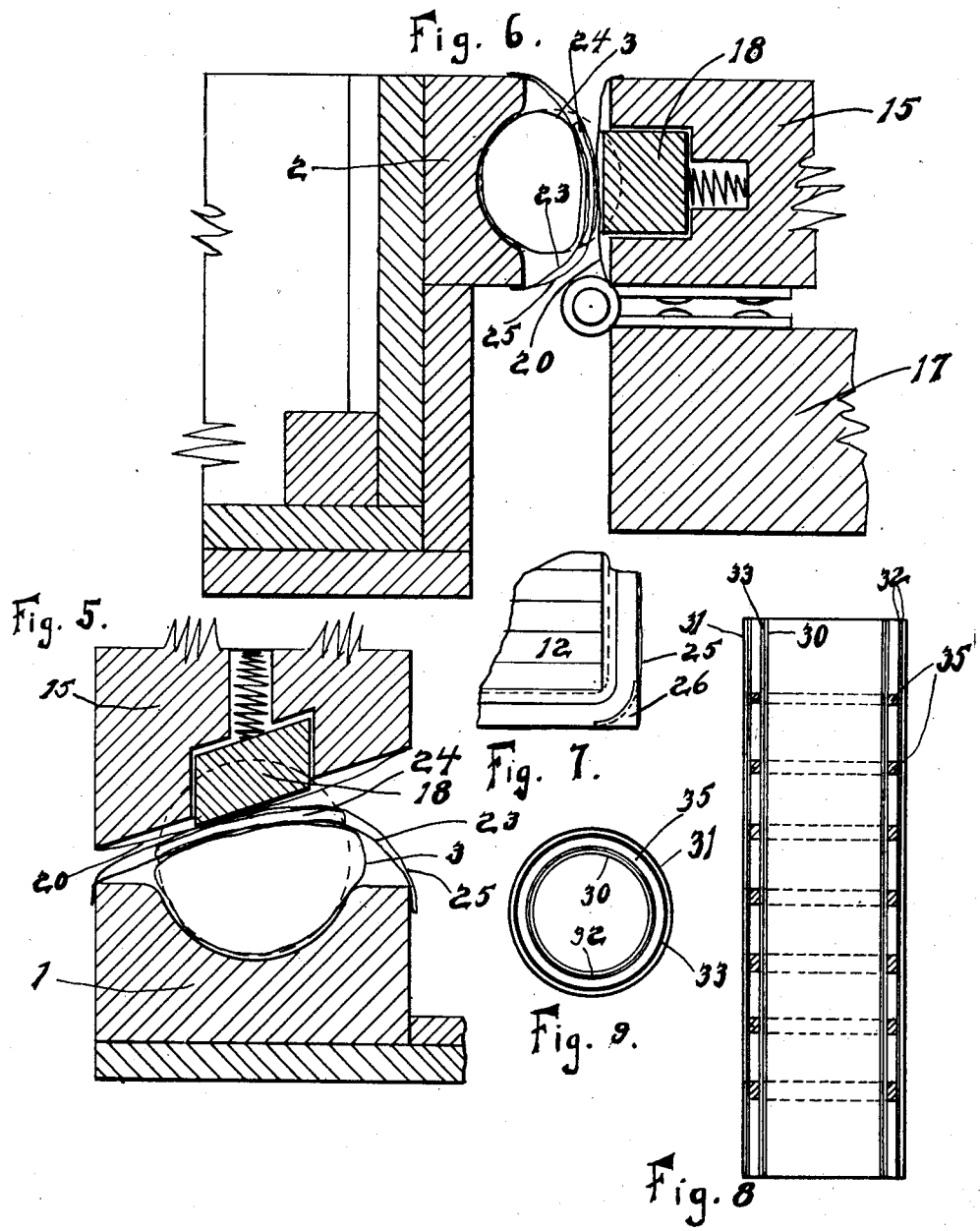

ARTHUR FAGET, OF SAN FRANCISCO, CALIFORNIA, ASSIGNOR TO PACIFIC ENGINEERING COMPANY, OF SAN FRANCISCO, CALIFORNIA, A COPARTNERSHIP.

CAR-PRECOOLING DOOR-OPENING CLOSURE.

998,082.         Specification of Letters Patent.       Patented July 18, 1911.

Application filed November 23, 1909. Serial No. 529,591.

*To all whom it may concern:*

Be it known that I, ARTHUR FAGET, citizen of the United States, residing at San Francisco, in the county of San Francisco and State of California, have invented a new and useful Car-Precooling Door-Opening Closure, of which the following is a specification in such full and clear terms as will enable those skilled in the art to construct and use the same.

This invention relates to means for precooling refrigerator cars with their load of fruit prior to their shipment from the point of origination.

An object of the invention is to produce a closure for the car doors or hatchways which can be inserted therein in a few moments, and made practically air-tight.

It will be noted by those skilled in the art that a car of fruit when first loaded is at a temperature substantially that of the climate in which the fruit is grown; that is to say, in the summer time in a climate such as the valleys of California, the fruit is at a temperature of from sixty to ninety degrees, or thereabout. If the fruit is packed in the cars and an ordinary charge of ice is given the car, and the journey immediately begun, it will require several days for the load of fruit to reach a temperature of about forty degrees, which is the desired temperature on the ordinary fruits, and the car must be iced several times during the trip to get down to that temperature. On the other hand, it has been discovered that by reducing the temperature of the air in the car and the load of fruit, very rapidly, by the circulation therein of very cold air, that the car contents and the air may be reduced to a temperature of forty degrees in about three hours. This precooling is advantageous in several ways: The fruit may be allowed to become riper on the trees, and the quantity of ice used during the trip is much less, since the car begins the trip with a full charge of ice, and the fruit and car air at the desired temperature. No ice is used in cooling the fruit to begin with, and the only ice that is used is for the maintenance of the desired low temperature.

In order to reduce the temperature of a number of cars very rapidly, since the cars must not be detained more than two or three or four hours after the fruit has been placed therein, it is necessary to have a very large plant for the circulation of air in the cars, and it is also necessary to have the car air as cold as it can be conveniently made, since the endeavor is to chill the air and the fruit in the car in as short a time as possible. Therefore the plugs inserted in the car door or in the hatchways thereof must be large, and since the air used is very cold owing to the short time of its application, practically none of it must be permitted to escape during the time the car is being chilled. It is also necessary to consider the car construction, since there are now thousands on thousands of cars in use, the construction of which could not be altered conveniently to suit the closure for the car door or hatchway.

In the drawing, in which the same numeral of reference is applied to the same portion throughout the several views, Figure 1 is a front elevation showing the plug in place in one of the side doors of the car, and showing the car doors open, each of the doors being partly broken away. Fig. 2 is a horizontal sectional view through the air supply pipe and plug. Fig. 3 is a vertical sectional view through the plug showing the contact of the plug with the sill and lintel of the door. Fig. 4 is a detail showing the contact of the plug with the door sill. Fig. 5 is a detail view showing the contact of the plug with the head of the car door opening, and Fig. 6 is a portion of the plug and the contact therewith with the side of the car door opening. Fig. 7 is a detail view of a portion of the plug, showing the means for making the opening airtight at the corners of the doors. Fig. 8 is a sectional view of the air pipe. Fig. 9 is an end view of said air pipe.

It is to be observed that inasmuch as the car door hinges shown in Figs. 1, 2 and 6 project beyond the edge of the door jamb, that whatever is used as a plug in the door must take account of this projection, and when released from the car must be removable therefrom within the space between the hinge pivots.

The plug proper comprises a frame built up substantially the size of the door, said frame having outside rails 1 at top, bottom and side rails 2, the top, bottom and side rails each being grooved for the reception of pneumatic tube 3. The side rails are connected by means of rails 5, 6 and 7, and at the lower portion of the plug there is an outer and inner covering 8 and 9. At the rail 7 there is a projecting box having a floor 10 supported by means of three braces 11, said box entering a considerable distance from the rear of the rail 7, and having a front 12 into which front the air tube 13 is secured.

Since the air supplied to the cars is as cold as it is conveniently possible to make the same, it is necessary to prevent the air from passing directly to the load of fruit in the car, which would extend about to the height of the rail 5; and a metal sheet 14 is secured to the inner portion of the plug, against which the air impinges from the pipe 13, the body of the air passing over the top of the rail 5 and into the car, thus avoiding striking the fruit directly and injuring the same.

The car wall 15 is provided with two doors 16 and 17, which fit tightly into the opening in which the air plug is placed, and in order that the doors may so fit, the sides and lintel of the door frame are each provided with movable spring-pressed plates 18 and 19, a canvas 20 being secured over this movable plate to make a substantially air tight joint when the door is closed. The air plug frame has a groove around its entire periphery, and in this groove is placed a pneumatic tube 3, which has an inlet valve 22 near the bottom of the air plug for the convenient attachment to a compressed air supply pipe line adjacent the car tracks. This pneumatic tube is covered with a layer of canvas 23 a felt pad 24 and a second layer of heavy canvas 25, as shown in the drawings; and in order that the pneumatic tube may make a tight joint at the corners of the doors, the tube is placed within a curved block 26, the outer corners of which form surfaces at a parallel to the sides of the air plug, as shown in Fig. 7.

Since the cars are never stopped in precisely the same place twice, it is necessary to have a flexible connection to the air plug from the air pipe lines, and since the air is used at as low a temperature as six degrees below zero, the climate in which the cooling system is installed frequently being as high as 110 or 115 degrees, it is very necessary that the pipe lines leading the air to the car be insulated as carefully as possible. The pipe used is shown in Figs. 8 and 9, and comprises a sheet rubber lining covering 30 and 31 respectively, canvas interlinings 32 and 33, the canvas and rubber supported in turn by means of wooden hoops 35, the canvas and rubber being riveted to the wooden hoops. This construction allows the plug to be inserted in a car door whether the car is within one two three or four feet of its proper position, and the inter-air space affords a very complete insulation for the cold air passing into the cars.

In operation the plug is suspended near the car track, and at about the proper space and height. When a car has been placed on the track the doors are opened and the plug inserted therein. The compressed air pipe is then attached to the air valve at the bottom of the plug, and the pneumatic tube is blown up until the plug is substantially air tight, with the door jamb and sill. The air valves are then opened, and, a like plug being inserted in the hatchway of the car, the cold begins to circulate into the car, cooling the fruit and air therein. This cooling process requires several hours, but not such a length of time as to delay the train or car unduly.

As soon as the fruit and air in the car have been reduced to the proper temperature, say about 40 degrees, the plug is removed from the car door by releasing the air in its pneumatic tube, and the doors are closed; the car is then ready to begin its journey at an initial temperature which could only be obtained by icing and the natural circulation of air after a period of a day or two.

It will be understood by those skilled in the art, that should it be desired the closure may be used in any opening which may be leaky, in the place of the regular door or hatchway closure by the omission of the air pipe.

Having thus described my invention, what I desire to secure by Letters Patent of the United States is as follows:

1. In a refrigerator car door plug, an airtight frame, an air pipe connected with said frame, an air deflecting plate secured to said frame and means surrounding the edge of the frame to secure said frame tightly in a car door, as set forth.

2. In a refrigerator car door plug, an airtight frame, an air pipe connected with said frame, an air deflecting plate secured to said frame and means surrounding the edge of said frame adapted to secure the same tightly in a car door, substantially as set forth.

3. In a refrigerator car door plug, an airtight frame, an air pipe connected with said frame, an air deflecting plate secured to said frame and a pneumatic tube surrounding the edge of said frame and adapted to secure the same tightly in a car door, substantially as described.

4. In a refrigerator car door plug, an airtight frame, an air pipe connected with said frame, a pneumatic tube surrounding the frame and blocks at the corners of the frame adapted to make an air-tight connection with the corners of the door frame, as set forth.

5. In a refrigerator car door plug, an airtight frame, an air pipe connected with said frame, means to secure said frame tightly in a car door, and a baffle plate at the back of said frame adapted to cause the air discharged therethrough to pass therefrom near the top of the frame, as set forth.

6. In a refrigerator car door plug, an airtight frame having a groove around its entire periphery, an air pipe connected with said frame, a pneumatic tube lying in the groove around the periphery of said frame, and blocks at the corners of the frame and over the outside of the pneumatic tube, as set forth.

7. In a refrigerator car door, an air pipe frame having a groove around its entire periphery, an air pipe connected with said frame, a pneumatic tube lying in the groove around said frame, and a covering over said tube and secured to the sides of the frame, substantially as set forth.

In testimony whereof I have hereunto set my hand this 16th day of November A. D. 1909, in the presence of the two subscribed witnesses.

ARTHUR FAGET.

Witnesses:
HUGH T. SIME,
C. P. GRIFFIN.

Copies of this patent may be obtained for five cents each, by addressing the "Commissioner of Patents, Washington, D. C."